W. FREDE.
PLANTER.
APPLICATION FILED JULY 24, 1908.
921,222.
Patented May 11, 1909.
4 SHEETS—SHEET 3.
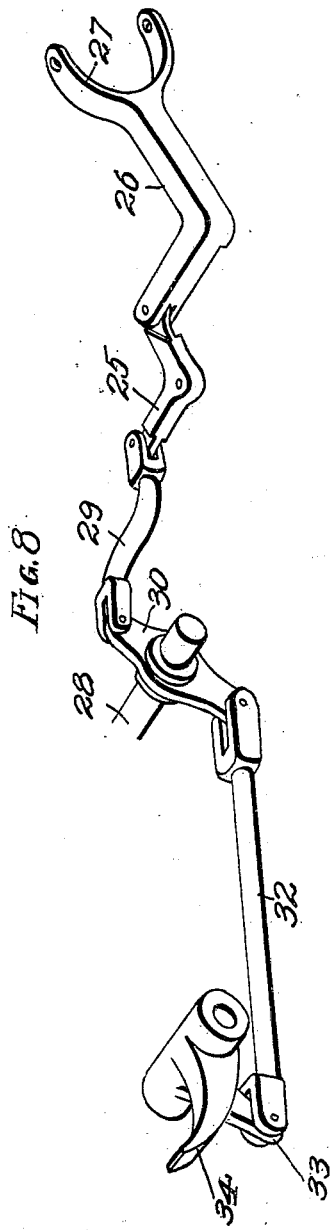
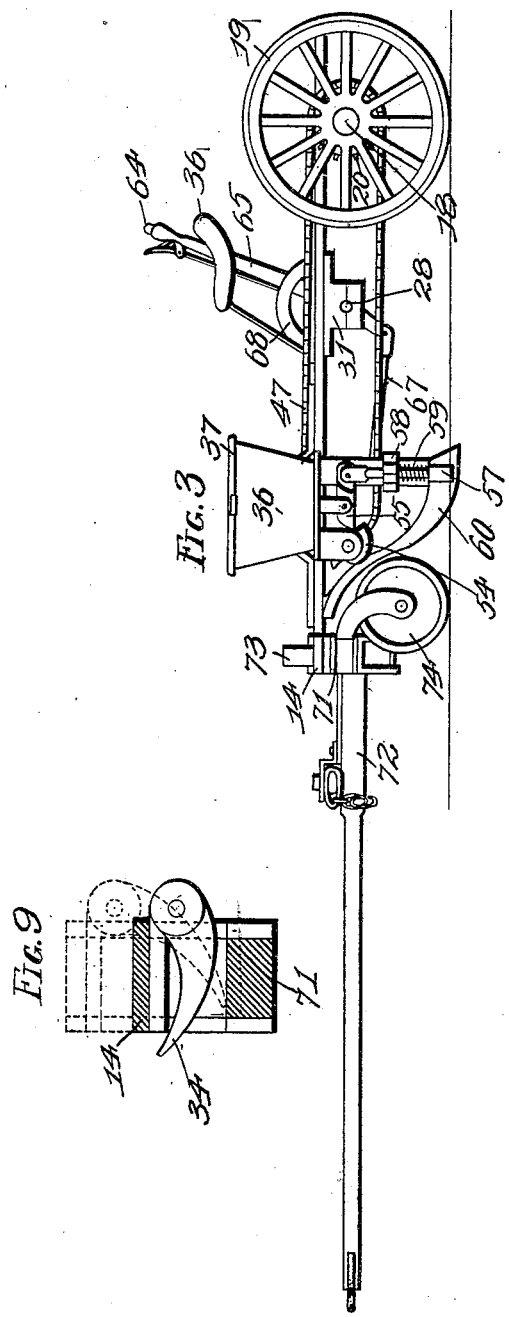

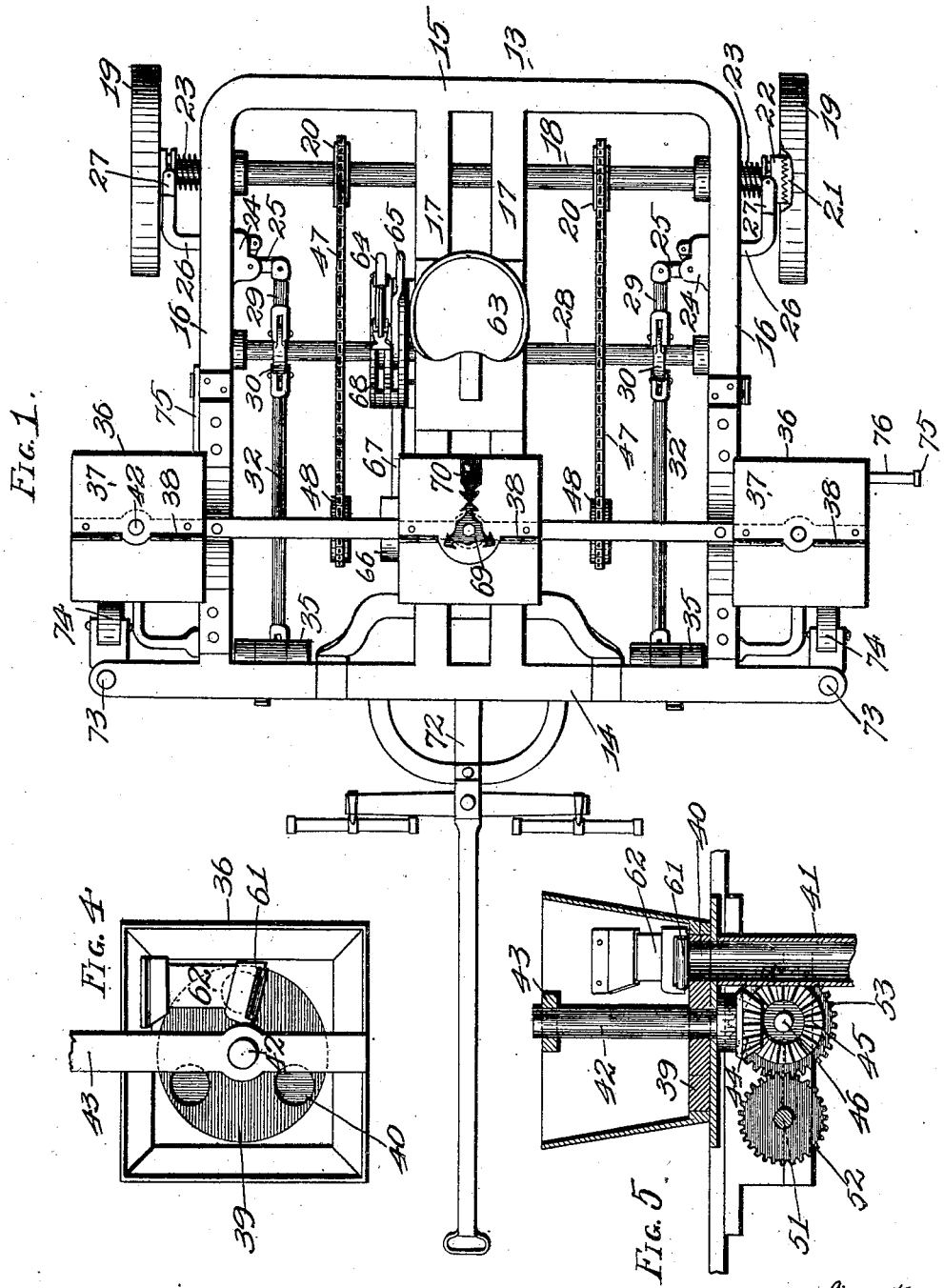

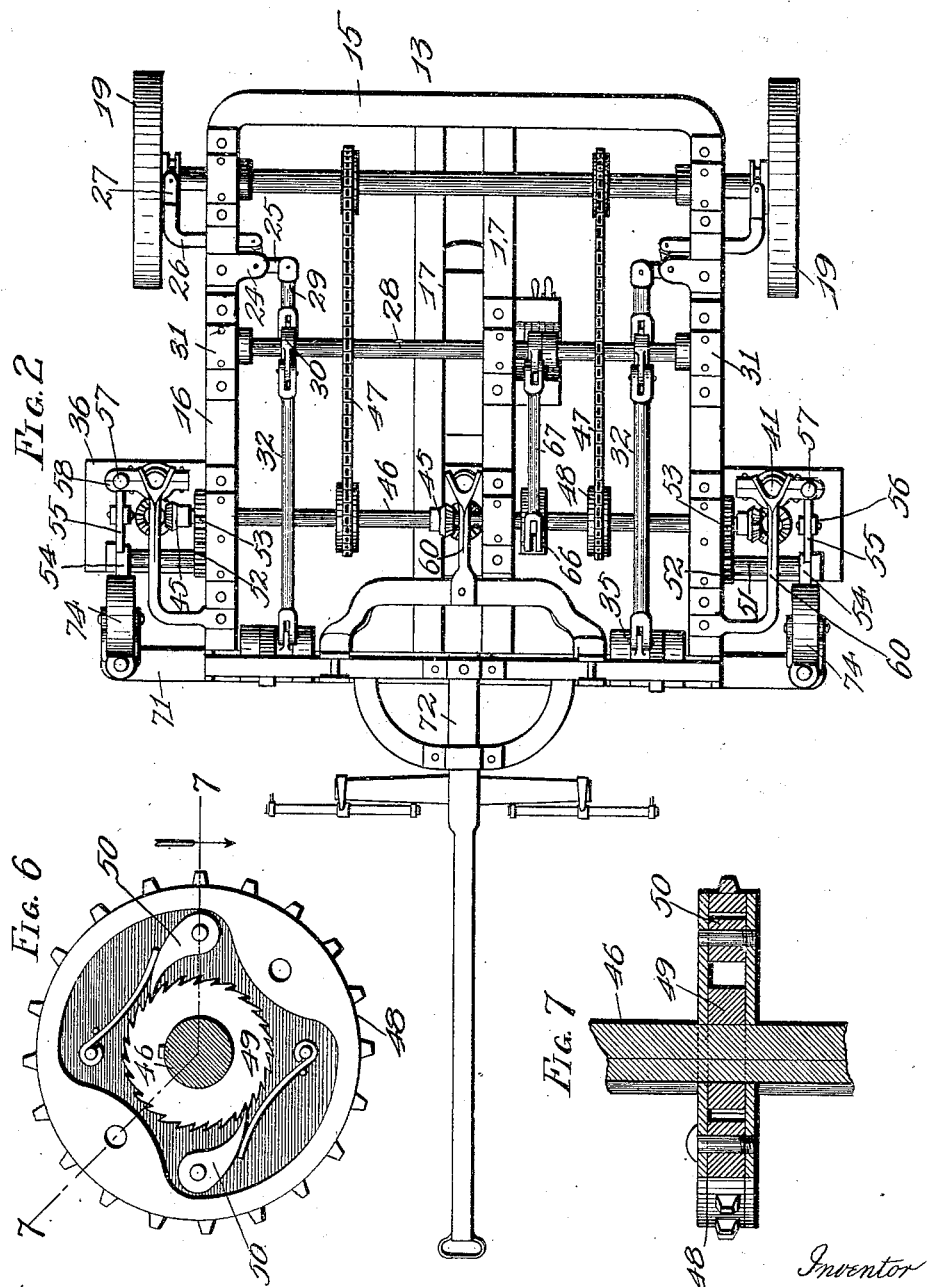

W. FREDE.
PLANTER.
APPLICATION FILED JULY 24, 1908.

921,222.

Patented May 11, 1909.
4 SHEETS—SHEET 4.

Witnesses
W. Ostein
L. A. L. McIntyre

Inventor
Wilhelm Frede
by Hopkins & Ericks Atty's

THE NORRIS PETERS CO., WASHINGTON, D. C.

UNITED STATES PATENT OFFICE.

WILHELM FREDE, OF ST. LOUIS, MISSOURI.

PLANTER.

No. 921,222.　　　　Specification of Letters Patent.　　　　Patented May 11, 1909.

Application filed July 24, 1908. Serial No. 445,254.

*To all whom it may concern:*

Be it known that I, WILHELM FREDE, a citizen of the United States, and resident of St. Louis, Missouri, have invented certain new and useful Improvements in Planters, of which the following is a specification.

This invention relates to improvements in planters and consists in the novel arrangement, construction and combination of parts as will be fully hereinafter described and claimed.

The object of my invention is to construct a planter to be used especially for planting corn and so arranged as to distribute the seed in perfect alinement and at equal distance apart.

A further object of my invention is to construct a device having a plurality of seed retainers in which is mounted a mechanism operated by the traction wheels regulating the discharge of the seed while the planter is in operation and a means for controlling the manipulation of the seed discharging mechanism and a marker for designating the location of the seed.

Figure 10:
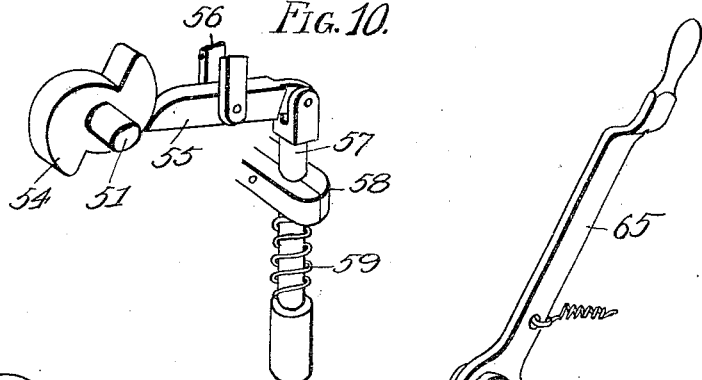
Figure 11:
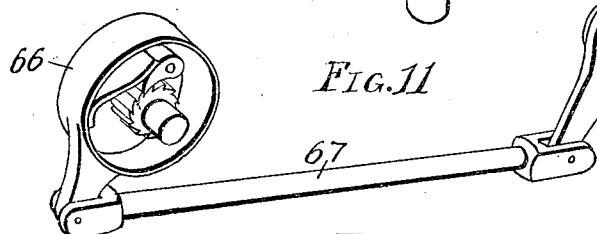
Figure 12:
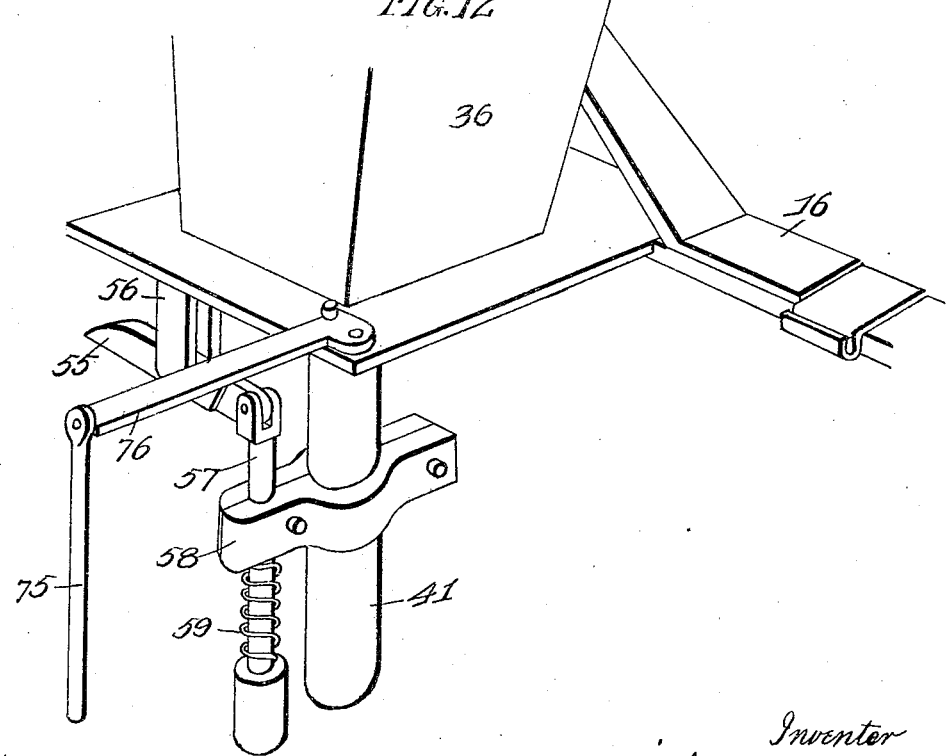

Figure 1 is a top plan view of my complete invention. Fig. 2 is a bottom plan view of the same. Fig. 3 is a side view. Fig. 4 is a top plan view of one of the seed retainers with the cover removed. Fig. 5 is a central vertical sectional view of the same. Fig. 6 is a side elevation of one of the sprocket wheels with its plate removed showing the internal ratchet mechanism. Fig. 7 is a cross sectional view taken on the line 7—7 of Fig. 6 viewing the same in the direction indicated by the arrow. Fig. 8 is a detail perspective view of the lever mechanism by which the clutch and elevating means is operated. Fig. 9 is a detail cross sectional view of the front section of the frame showing the manner of elevating the frame. Fig. 10 is a detail perspective view of the marker mechanism. Fig. 11 is a detail perspective view of the lever and ratchet mechanism by which the seed controlling disks may be operated. Fig. 12 is a detail perspective view of a portion of the seed retainer and the planter frame showing the marker and indicator in their relative position with the seed tube.

In the construction of my invention, I provide a suitable frame 13 consisting of a front rail 14 and rear rail 15 connected together by the side rails 16 and the center rails 17. The frame 13 is supported at its rear end on the driving axle or shaft 18 on which are mounted the traction wheels 19. The said axle is supported in suitable bearings and on said axle are keyed a pair of sprocket wheels 20. On the hubs of the traction wheels 19 are located clutch members 21, and on the shaft 18 between the wheels and the frame is slidably mounted a companion clutch member 22, which is brought in contact with the clutch member 21 of the wheel when it is desired to operate the driving wheel 19. Upon the shaft, the clutch member 22 and the bearing is located a spiral spring 23 which assists in operating the clutch member. On the frame and immediately in front of the shaft bearings are located brackets 24 in which are pivotally located a bell crank 25. To one end of said bell crank is connected one end of the bifurcated clutch arm 26, the bifurcated portion 27 straddling the clutch whereby the same may be shifted in and out of contact by the manipulation of the shaft 28. To the opposite end of the bell crank 25 is attached a short connecting arm 29; the opposite end of said arm being connected to one end of the fulcrum 30 is rigidly supported on the shaft 28, the said shaft 28 extending across the entire planter frame and its end supported in bearings 31 located beneath the same. To the opposite end of the fulcrum 30 is attached a connecting rod 32, the opposite end of which is attached to the arm 33 of the tilting prong 34 which is supported in bearings 35 carried by the front rail 14.

On the side rails and center rails are mounted the seed retainers or hoppers 36 in which the seed is placed, the top of said retainers being provided with the cover 37, half of said cover being movably attached to the remaining half by the hinges 38 so that access may be had to the interior. At the bottom of each retainer is located a revolving disk 39 in which is formed a plurality of openings 40 of sufficient size to accommodate the required number of seed to be conveyed to the seed tube 41 located beneath the retainer and in such position as to be in alinement with the openings 40 and said disks 39 are secured to a shaft 42 which extends upwardly through the retainers and are supported in bearings 43 located at the top of the retainers, the lower end of said shaft is provided with a bevel gear 44 which meshes with a bevel gear 45 located on a shaft 46 which extends across the planter frame beneath the seed retainers, and this shaft is placed in operation by the chains 47 extending from the sprocket wheels 20 on the driving shaft to the sprocket wheels 48 located on the shaft 46. Each of the sprocket wheels 48 (see Fig. 6 are) provided with an internal ratchet mechanism which consists of a ratchet wheel 49 keyed upon the shaft 46, the sprocket wheels 48 loosely mounted on said shaft and motion is imparted to the sprocket wheels 48 by means of the spring actuated pawls 50 supported in the sprocket wheel, the teeth coming in contact with the teeth of the ratchet wheel permitting the shaft to revolve when motion is imparted to the sprocket wheels 48 by the chains.

Beneath the two outer seed retainers and located in suitable bearings is a short shaft 51, one end of which is provided with a gear pinion 52 which meshes with a gear 53 located on the shaft 46 immediately to one side of the bevel gear 45 and on the opposite end of the short shaft 51 is located a double cam 54 which when revolved comes in contact with the lever 55 operating the same, the said lever being supported in bearings 56 located beneath the seed retainers, the opposite end of said lever being attached to the marker 57, the said marker operating in the bearing 58 supported around the seed tube 41 and around said marker is located an expansive spring 59, which has a tendency to operate the marker with a sudden jolt when the end of the lever 55 has been released from the cam 54, making an indentation in the earth to one side of said tube, so as to indicate to the operator, the position of the planted seed.

On the lower end of the seed tube is attached the ordinary furrow-opener 60, the furrow being closed and the seed covered by the traction wheels 19. In each of said retainers or hoppers, I place a roller cut-off 61 mounted on an arm 62 which is tiltingly located in the hopper and supported to one side thereof, the roller being so arranged as to ride upon the upper surface of the disk 39 and of such width as to extend across the opening to remove such surplus seed as will not lodge in the opening, and by this mechanism only a certain number of seed are permitted to pass into the tube. The gearing, and the arrangement of the disks is such that the seeds are permitted to drop at a certain interval apart.

On the center rails 17 is located the driver's seat 63. To the side thereof is located, a clutch operating lever 64 and a disk operating lever 65. The clutch operating lever 64 is rigidly attached to the shaft 28 while the lever 65 is loosely mounted on said shaft, its lower projecting end being connected to a connecting rod 67 which connects a ratchet 66 located on the shaft 46. The clutch operating lever 64 is held in its adjusted position by the segment 68 supported on one of the center rails 17.

On the top of the center seed retainer and rigidly connected to the shaft 42, I provide an indicator 69 which is so arranged as to correspond with the relative position of the openings in the disk and on the cover 37 is located a pointer 70 which indicates to the driver the location of the openings and acts as a guide for planting.

Beneath the front rail 14 is mounted a bar 71 to which is attached the tongue 72 and through the ends of said bar and the front rail 14 is passed the pins 73 to which are connected the swivel wheels 74. Between the bar 71 and the front rail 14 operate the tilting prongs 34; the prong coming in contact with the bar when the clutch operating lever is manipulated, bringing the prong downwardly thereby raising the frame upwardly a sufficient distance to lift the furrow-openers away from the ground, at the same time releasing the clutches permitting the traction wheels to operate freely and independently of the major portion of the mechanism.

The operation of my invention is as follows: After the several hoppers have been filled with seed and the planter conveyed to the section of the farm on which the seed is to be planted, the operator after having brought the planter into position, manipulates the clutch operating lever, lowering the frame at the same time throwing the clutches in gear. He then notes the indicator on the center hopper placing the indicator in such position that the pointer and one of the prongs are in alinement. This can be done by the manipulation of the hand lever 65. Then the team is started and as the planter is conveyed forward the shaft 46 is revolved by the chains 47 and in turn through the mechanism located beneath each hopper the disks are revolved, permitting the required amount of seed to fall through the seed tube into the furrow below formed by the furrow-openers. When the end of the stretch of ground has been reached and it is desired to return, the operator manipulates the clutch operating lever throwing the operating mechanism out of gear. Then he notes the several indentations made in the ground by the markers and by means of the depending rod 75 located on the end of the projecting arm 76 which is pivotally attached to one side of the hopper, he drives the team so that the depending rod is directly above the row of indentations and before dropping the seed to form the next row, he manipulates the hand lever 65 until the indicator registers with the pointer, then the team is started and the seed is dropped in perfect alinement with the seed already planted so that when the corn or other grain planted, sprouts, the rows are absolutely in perfect alinement in both directions.

Having fully described my invention what I claim is:

A device of the class described, comprising a suitable frame; the front portion provided with swivel wheels; a driving shaft located at the rear portion of the frame; traction wheels mounted on the driving shaft; clutches mounted on the driving shaft to be brought into communication with the traction wheels for placing the driving shaft in operation; a lever mechanism supported on the frame for operating the clutches; a plurality of seed hoppers carried by the frame and arranged at equal intervals apart; a shaft located beneath the hoppers; a perforated revolving disk located in the bottom of each hopper and placed in revolution by the shaft beneath the hoppers; a marking device located at one side of the hopper chute and operated by the shaft; an indicator mounted on one of the hoppers to designate the position of the disks in the hoppers; a pair of hand levers for operating the clutch mechanism and the indicator mechanism independently; a tilting mechanism by which the frame can be raised and lowered; and a designating device for properly spacing the rows and properly planting, substantially as specified.

In testimony whereof, I have signed my name to this specification, in presence of two subscribing witnesses.

WILHELM FREDE.

Witnesses:
 ALFRED A. EICKS,
 WALTER C. STEIN.